(12) United States Patent
Brunet et al.

(10) Patent No.: US 9,870,104 B2
(45) Date of Patent: Jan. 16, 2018

(54) DYNAMIC CLUSTERING OF TOUCH SENSOR ELECTRODES

(71) Applicants: Samuel Brunet, Cowes (GB); Richard Paul Collins, Southampton (GB); Luben Hristov, Sofia (BG); Steinar Myren, Vikhammer (NO); Trond Jarle Pedersen, Trondheim (NO); Paul Stavely, Southampton (GB)

(72) Inventors: Samuel Brunet, Cowes (GB); Richard Paul Collins, Southampton (GB); Luben Hristov, Sofia (BG); Steinar Myren, Vikhammer (NO); Trond Jarle Pedersen, Trondheim (NO); Paul Stavely, Southampton (GB)

(73) Assignee: Atmel Corporation, San Jose, CA (US)

( * ) Notice: Subject to any disclaimer, the term of this patent is extended or adjusted under 35 U.S.C. 154(b) by 546 days.

(21) Appl. No.: 13/955,352

(22) Filed: Jul. 31, 2013

(65) Prior Publication Data

US 2015/0035784 A1   Feb. 5, 2015

(51) Int. Cl.
*G06F 3/041*   (2006.01)
*G06F 3/044*   (2006.01)

(52) U.S. Cl.
CPC ............ *G06F 3/044* (2013.01); *G06F 3/0416* (2013.01); *G06F 3/0418* (2013.01); *G06F 2203/04101* (2013.01); *G06F 2203/04108* (2013.01)

(58) Field of Classification Search
CPC .................................. G06F 3/044; G06F 3/041
See application file for complete search history.

(56) References Cited

U.S. PATENT DOCUMENTS

| | | | |
|---|---|---|---|
| 6,323,846 B1 * | 11/2001 | Westerman | G06F 3/0235 345/173 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |

(Continued)

FOREIGN PATENT DOCUMENTS

WO   WO 2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Jennifer Mehmood
*Assistant Examiner* — Carl Adams
(74) *Attorney, Agent, or Firm* — Baker Botts L.L.P.

(57) ABSTRACT

In one embodiment, an apparatus includes a sensor having a plurality of electrodes and a controller having a processor and a memory. The memory includes logic operable, when executed by the processor, to connect each electrode of a first subset of the plurality of electrodes, apply voltage to the first subset, and determine a first value associated with a capacitance of the first subset. Based at least on the first value, the logic is further operable to connect each electrode of a second subset of the plurality of electrodes, the second subset having fewer electrodes than the first subset, apply voltage to the second subset, and determine a second value associated with a capacitance of the second subset.

23 Claims, 7 Drawing Sheets

(56) References Cited

U.S. PATENT DOCUMENTS

| | | |
|---|---|---|
| 8,049,732 B2 | 11/2011 | Hotelling |
| 8,179,381 B2 | 5/2012 | Frey |
| 2009/0085891 A1* | 4/2009 | Yang ........................ G06F 3/044 345/174 |
| 2009/0255737 A1* | 10/2009 | Chang ...................... G06F 3/044 178/18.06 |
| 2009/0315854 A1 | 12/2009 | Matsuo |
| 2010/0073325 A1* | 3/2010 | Yang ........................ G06F 3/044 345/174 |
| 2011/0134073 A1* | 6/2011 | Ahn ........................ G06F 3/044 345/174 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0050137 A1* | 2/2013 | Yang ........................ G06F 3/044 345/174 |
| 2013/0076612 A1 | 3/2013 | Myers |

* cited by examiner

US 9,870,104 B2

DYNAMIC CLUSTERING OF TOUCH SENSOR ELECTRODES

TECHNICAL FIELD

This disclosure relates generally to touch sensor technology; and more particularly to dynamic clustering of touch sensor electrodes.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A touch-sensor controller may process the change in capacitance to determine its position on the touch screen.

The drawings included in the Figures are not drawn to scale.

DESCRIPTION OF EXAMPLE EMBODIMENTS

Figure 1:
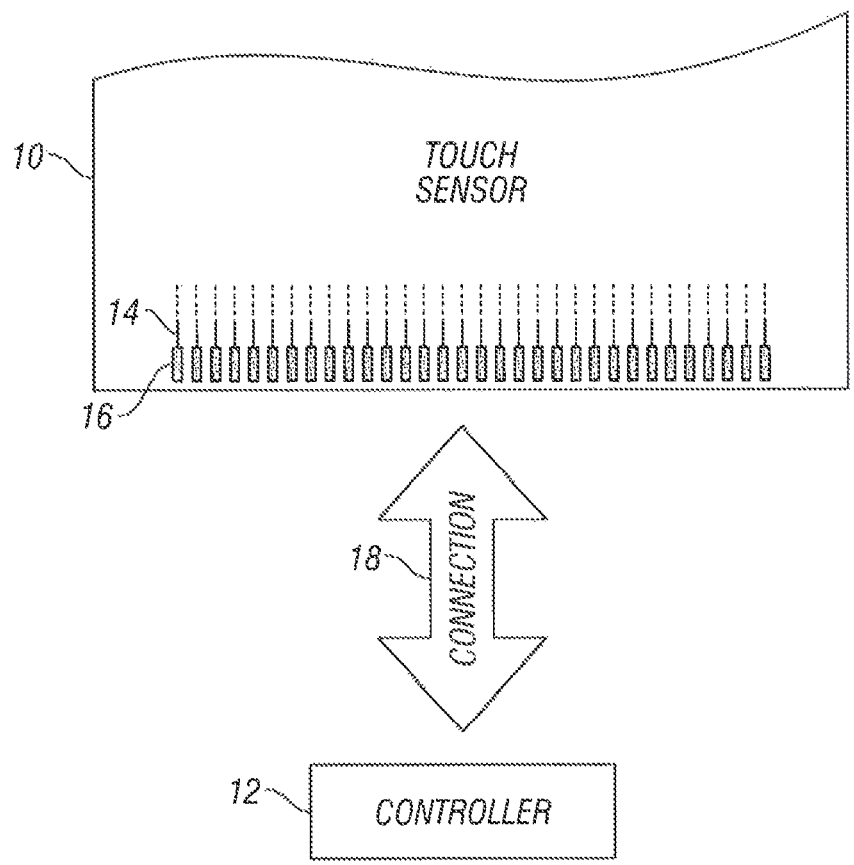
FIG. 1 illustrates an example touch sensor with an example touch-sensor controller that may be used in certain embodiments of the present disclosure.

FIG. 1 illustrates an example touch sensor 10 with an example touch-sensor controller 12, according to certain embodiments of the present disclosure. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on. Alternatively, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates electrodes made of any suitable material.

As used herein, a capacitive node refers to a portion of touch sensor 10 that is configured to provide a distinct capacitive measurement. In various embodiments, capacitive nodes may have different sizes, shapes, and/or configurations. Furthermore, in some embodiments, the size, shape, and other aspects of a capacitive node may be determined by the configuration of touch-sensor controller 12 and may be changed dynamically during the operation of device 2. For example, in some embodiments, multiple tracks 14 may be galvanically connected and sensed together, resulting in a capacitive node spanning multiple electrodes.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. A touch may refer to an external object touching a capacitive node directly or touching a cover or substrate adjacent to the capacitive node. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. In such embodiments, a capacitive node may correspond to a single electrode, or a set of multiple connected electrodes, rather than an intersection of tracks 14. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. In some embodiments, this dielectric may be air. Moreover, this disclosure contemplates electrodes disposed on any suitable number of substrates.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Certain embodiments of touch sensor 10 and touch-sensor controller 12 may measure capacitance or a change in capacitance using any suitable method. For example, voltage may be applied to one or more tracks 14 by opening or closing one or more switches associated with one or more tracks 14. Such switches may connect one or more tracks 14 to other portions of touch sensor 10 or touch-sensor controller 12 such as, for example, a voltage source (e.g. a voltage supply rail), a current source, or any other suitable component. Such methods may cause charge to be transferred to or from one or more portions of one or more tracks 14. In self-capacitance embodiments, the charged one or more tracks 14 may be sensed to measure a value associated with the capacitance of the one or more tracks 14. The presence of an object such as a finger or a stylus may change the amount of charge induced on the sensed track 14, and this change may be measured by touch-sensor controller 12 to determine the position of the object. The position may be a distance between the object and touch sensor 10 (e.g., a hover detection) and/or a projection of a portion of the object onto touch sensor 10 (e.g., a point on touch sensor 10 where the object is touching or hovering). Thus, in an embodiment where the surface of touch sensor 10 lies in the X-Y plane and the Z axis is orthogonal to the X-Y plane, the position may correspond to the X coordinates of the object, Y coordinates, Z coordinates, X-Y coordinates, X-Z coordinates, Y-Z coordinates, X-Y-Z coordinates, any reference position correlating with X, Y, or Z coordinates, or any other suitable position information. In certain embodiments, the same measured values may be used to determine both of the distance between the object and touch sensor 10 and the projection of a portion of the object onto touch sensor 10. Touch-sensor controller 12 may also factor in additional measurements and/or calculations to determine this position. For example, multiple tracks 14 may be sensed synchronously or in close succession, and the position of the object may be determined based on a calculation factoring in each of these measurements. Furthermore, certain embodiments may utilize weighted averages, linear approximation, or any suitable combination thereof to facilitate the determination of the object's position.

Certain embodiments may perform measurements using any suitable number of steps that facilitate capacitance measurements. For example, some embodiments may perform any suitable combination of pre-charging one or more tracks 14, charging one or more tracks 14, transferring charge between two or more tracks 14, discharging one or more tracks 14, and/or any other suitable step. In some embodiments, a transfer of charge may be measured directly or indirectly. For example, certain embodiments may utilize voltage measurements, current measurements, timing measurements, any other suitable measurement, or any combination thereof to measure capacitance or a change in capacitance at one or more capacitive nodes. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of an object's position relative to touch sensor 10.

Figure 2:
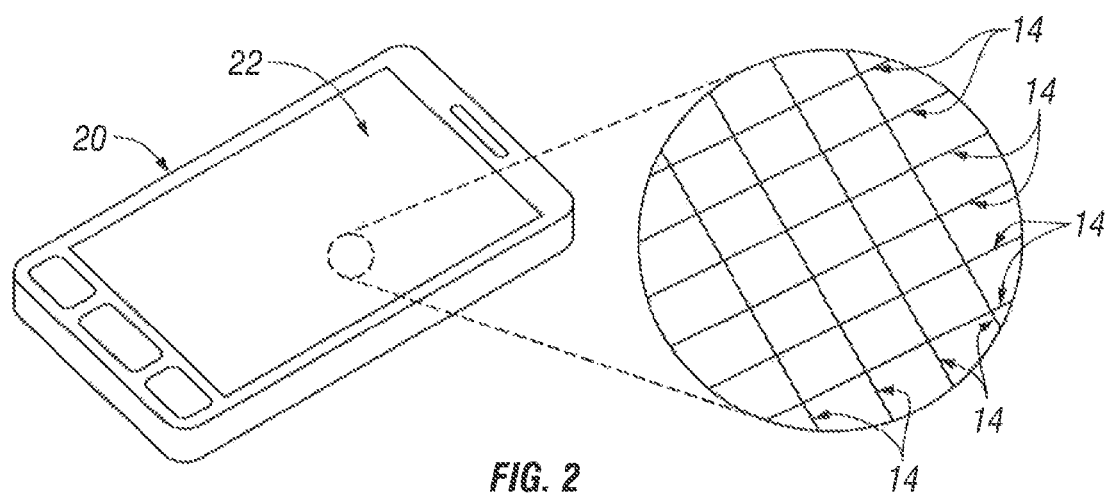
FIG. 2 illustrates an example device and example electrode tracks that may be used in certain embodiments of the present disclosure.

FIG. 2 illustrates an example device 20 and example electrode tracks 14 that may be used in certain embodiments of the present disclosure. In the illustrated embodiment, device 20 includes touch screen 10, which includes tracks 14.

Device 20 may be any touch-sensing device or component. In various embodiments, device 20 may be a smartphone, tablet computer, laptop computer, or any suitable device utilizing a touch sensor 10. Device 20 may include a display 21 that may be overlaid by or otherwise positioned proximate to touch sensor 10. Display 21 and touch sensor 10 may be substantially planar, curved, or have any other suitable configuration.

Tracks 14 may include any structure, configuration, and/or function described above with respect to FIG. 1. While the illustrated embodiment depicts certain tracks 14 running across display 21 perpendicular to certain other tracks 14, other embodiments may use any suitable configuration of tracks 14. For example, certain embodiments of tracks 14 may utilize different shapes, patterns, and/or configurations. Furthermore, certain embodiments may use different types, shapes, or configurations of tracks 14 within the same touch sensor 10. For example, in some embodiments, tracks 14 may be electrode "lines" that may be parallel, perpendicular or have any suitable orientation relative to other tracks 14. In alternative embodiments, which may include certain self-capacitance embodiments, tracks 14 may be non-linear electrodes, rather than intersecting "lines," such that each column and/or row of touch sensor 10 may include multiple tracks 14, each of which is separately connected or connectable to touch-sensor controller 12. In such embodiments, the sensing portion of track 14 may have any suitable shape (e.g., square, round, triangular, hexagonal, or any other suitable shape). Furthermore, such electrodes may be of a single type or multiple types, and each may form a capacitive node. As used herein, track 14 may refer to such electrodes, the track of conductive material connecting the electrode to touch-sensor controller 12, or both, as appropriate.

In self capacitance embodiments, when an object touches or approaches a capacitive node, a change in self-capacitance may occur at the capacitive node and touch-sensor controller 12 may measure the change in capacitance. As a particular example, a change in capacitance may be measured as a change in the amount of charge needed to raise the voltage at the capacitive node by a pre-determined amount. By measuring changes in capacitance throughout the array of electrodes, controller 12 may determine the position of the touch or proximity within the touch-sensitive area(s) of touch sensor 10. Furthermore, multiple tracks 14 may be galvanically connected to form a cluster that can be sensed as a single capacitive node, which may increase the sensitivity of touch sensor 10 and/or reduce noise interference experienced by touch sensor 10. This disclosure contemplates any suitable form of capacitive touch sensing, where appropriate. For example, other embodiments may utilize mutual capacitance sensing.

Figure 3A:
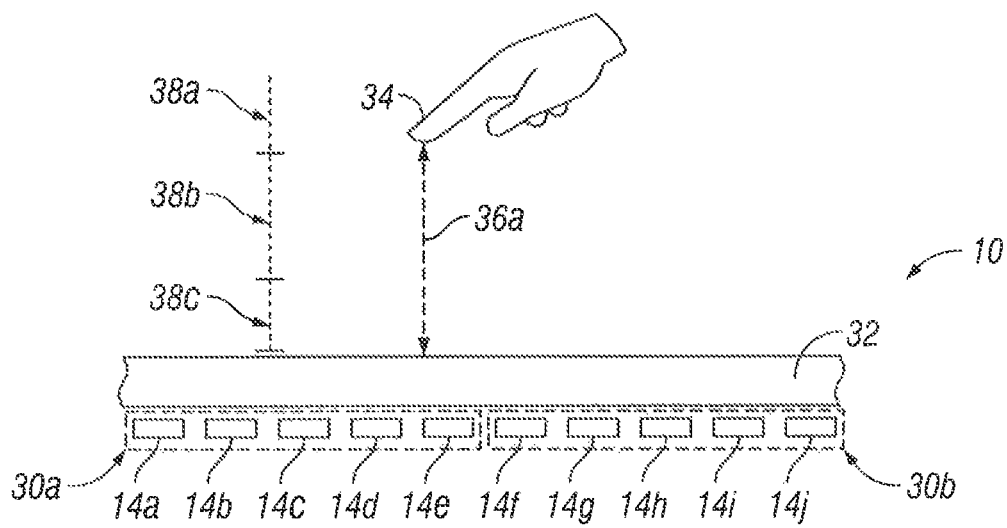
FIG. 3A illustrates an example cluster configuration that may be used in certain embodiments of a touch sensor.

FIG. 3A illustrates an example cluster configuration that may be used in certain embodiments of a touch sensor 10. Touch sensor 10 includes clusters 30a and 30b and panel 32. In the illustrated embodiment, touch sensor 10 may detect the presence and/or position of object 34, which is located a distance 36a from touch sensor 10.

Panel 32 may be any material proximate to tracks 14 and configured to be positioned between tracks 14 and object 34. Panel 32 may be glass, plastic, or any suitable material through which electric fields generated by tracks 14 may interact with object 34. In certain embodiments, panel 32 may be transparent, though this is not required. Panel 32 may be formed as a separate layer from tracks 14, and in such embodiments, panel 32 may be affixed to a portion of touch sensor 10 via an adhesive. In some embodiments, panel 32, tracks 14, and/or one or more substrates may be integrally formed.

Clusters 30a and 30b include tracks 14a-14e and tracks 14f-14j, respectively. As used herein, a "cluster" may refer to a single track 14 or multiple tracks 14 connected such that they can be charged and/or sensed as a single unit. In some embodiments, tracks 14 may be "connected" by galvanically connecting the tracks 14, though any suitable method of connecting tracks 14 may be used (e.g., multiple tracks 14 may be sensed together by capacitively coupling the tracks 14 via a sufficiently large capacitance). Furthermore, the one or more tracks 14 forming a cluster 30 may include any type, structure, and/or configuration discussed above with respect to tracks 14 of FIGS. 1 and 2. For example, certain embodiments may include a cluster 30 of parallel tracks, perpendicular tracks, or both. As another example, certain embodiments may include one or more non-linear self-capacitance electrodes of one or more tracks 14. Thus, clusters 30 may be a set of one or more linear electrode tracks 14, a set of non-linear electrodes, or any suitable configuration of electrodes. As a particular example, the electrodes of cluster 30 may form a triangle, square, hexagon, or other geometric shape from a perspective orthogonal to the surface of touch sensor 10. In some embodiments, a cluster 30 may include all tracks 14 of touch sensor 10. The tracks 14 of a cluster may be adjacent, though this is not required. Furthermore, multiple clusters 30 may be sensed simultaneously or in close succession, which may allow touch-sensor controller to determine the position of object 34 taking into account multiple values.

In the illustrated embodiment, clusters 30a and 30b each include five galvanically connected electrode tracks 14. Such tracks 14 may be galvanically connected by, for example, using various switches of touch-sensor controller 12. Galvanically connecting tracks 14 to form clusters 30 in this manner may increase the sensitivity of touch sensor 10, which may enable detection of the presence and/or position of object 34 at greater distances from touch sensor 10. Such embodiments may also reduce noise interference experienced during the sensing sequence since a stronger signal may be generated relative to the noise effects impacting the measured capacitance values. Galvanically connecting tracks 14 to form clusters 30 may result in improved noise protection compared to touch sensors that sum measurements of the individual tracks 14, because such touch sensors may also effectively sum the noise interference experienced by the tracks 14.

Object 34 may be any external object whose presence and/or position may be detected by touch sensor 10. Object 34 may be a finger, hand, stylus, or any suitable object. In the illustrated embodiment, object 34 is a finger located distance 36a from touch sensor 10. As used herein, a distance from touch sensor 10 may refer to the distance between object 34 and panel 32, tracks 14, or any suitable portion of touch sensor 10.

Ranges 38a-38c may be any suitable ranges corresponding to positions of object 34 that may trigger a change in the configuration of clusters 30. For example, range 38a may be 8-20 mm and may be associated with a cluster size of five tracks 14, range 38b may be 4-10 mm and may be associated with a cluster size of three tracks 14, and range 38c may be 0-5 mm and may be associated with a cluster size of two tracks 14. Other embodiments may use any suitable values for ranges 38. Furthermore, various embodiments may use any number of ranges 38, which may be associated with any suitable cluster size. For example, a particular embodiment may have separate ranges associated with clusters of size 1-10. Furthermore, certain embodiments may not explicitly calculate an estimated distance of object 34 from touch sensor 10. For example, certain embodiments may change cluster configurations based directly on one or more measured capacitance values (rather than using those values to determine distance 36 and then using distance 36 to determine the cluster configuration). Thus, in some embodiments, changes in the configuration of clusters 30 may not directly correspond to the distance of object 34 from touch sensor 10. As a particular example, different objects 34 at the same distance from touch sensor 10 may result in different capacitance values measured by a single cluster 30. As another example, some embodiments may factor in the relative measurements from multiple clusters 30 in determining the appropriate cluster configuration, so different objects 34 (for example, a fingertip vs. a hand) at the same distance from touch sensor 10 and causing the same capacitive measurement at a single cluster 30 may nevertheless trigger different cluster configurations.

In operation, tracks 14a-14e are connected to form cluster 30a, and tracks 14f-14j are connected to form cluster 30b. This connection may be a galvanic connection. Voltage is applied to cluster 30a and 30b, and a capacitance value associated with each cluster 30 is determined using any suitable sensing method described above with respect to FIGS. 1 and 2. Clusters 30a and 30b may be sensed synchronously or sequentially. Based on the measured values, touch-sensor controller 12 may determine a distance between object 34 and touch sensor 10. Based on the measured distance, touch-sensor controller 12 may maintain the same cluster configuration or switch to a different cluster configuration. For example, touch-sensor controller 12 may determine whether the measured distance falls in one or more ranges 38. In the illustrated embodiment, distance 36a falls within range 38a. As object 34 moves to distance 36b from touch sensor 10, touch-sensor controller 12 may determine that object 34 has moved within range 38b and transition to the cluster configuration shown in FIG. 3B. Any suitable cluster configuration and/or range may be used.

Figure 3B:
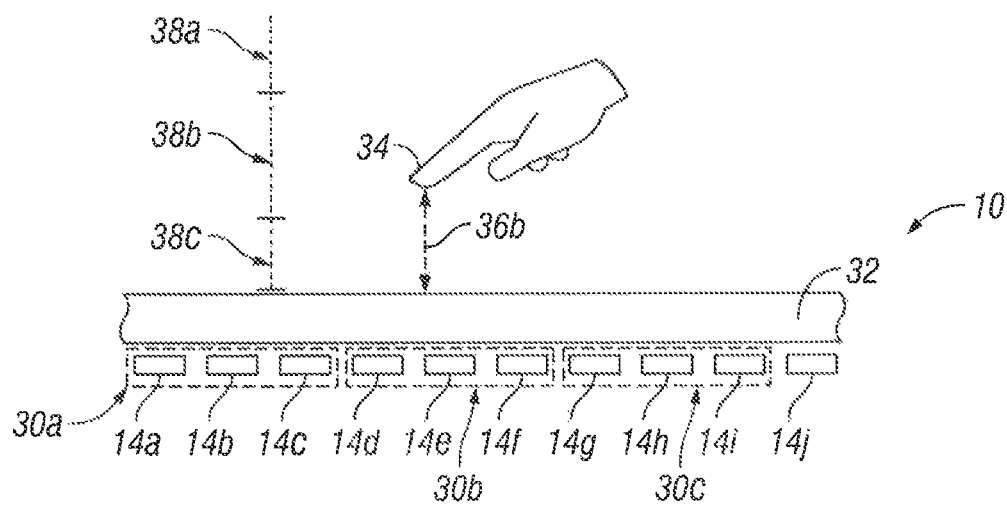
FIG. 3B illustrates an example cluster configuration that may be used in certain embodiments of a touch sensor.

FIG. 3B illustrates an example cluster configuration that may be used in certain embodiments of touch sensor 10. Touch sensor 10 includes clusters 30a, 30b, and 30c and panel 32. In the illustrated embodiment, touch sensor 10 may detect the presence and/or position of object 34, which is located a distance 36b from touch sensor 10.

Clusters 30a, 30b, and 30c include tracks 14a-14c, tracks 14d-14f, and tracks 14g-14i, respectively. Track 14j may be part of an additional cluster 30 that is not shown. In the illustrated embodiment, clusters 30a-30c each include three galvanically connected electrode tracks 14. Such tracks 14 may be galvanically connected by, for example, using various switches of touch-sensor controller 12. Connecting tracks 14 to form clusters 30 in this manner may increase the sensitivity of touch sensor 10, which may enable detection of the presence and/or position of object 34 at greater distances from touch sensor 10. Clusters of three tracks 14 may be more sensitive than clusters of two tracks 14 (see, e.g., FIG. 3C) but less sensitive than clusters of five tracks 14 (see, e.g., FIG. 3A). Certain embodiments may reduce noise interference experienced during the sensing sequence since a stronger signal may be generated relative to the noise effects impacting the measured capacitance values. Connecting tracks 14 to form clusters 30 may result in improved noise protection compared to touch sensors that sum measurements of the individual tracks 14, because such touch sensors may also effectively sum the noise interference experienced by the tracks 14.

Figure 3C:
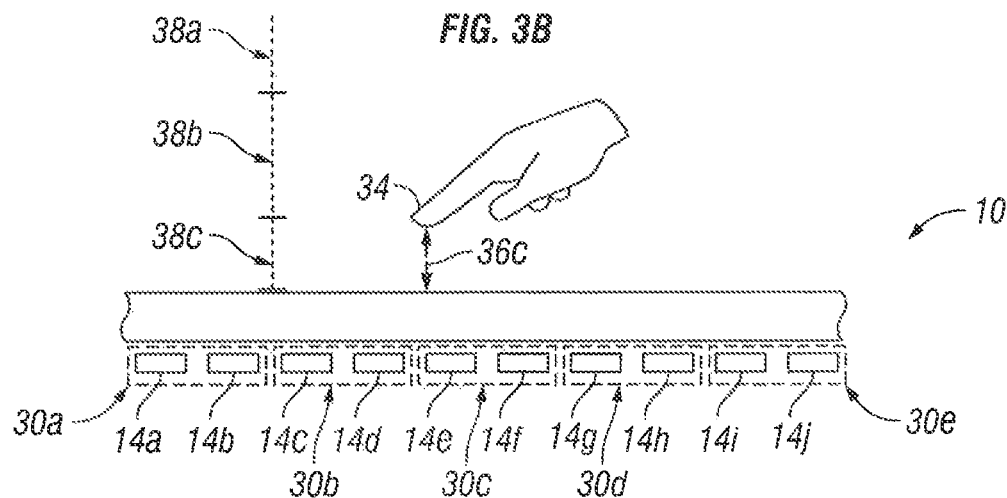
FIG. 3C illustrates an example cluster configuration that may be used in certain embodiments of a touch sensor.

In the illustrated embodiment, object 34 is located distance 36b from touch sensor 10, which falls within range 38b. Touch-sensor controller 12 may configure clusters 30 as shown in FIG. 3B in response to determining that the measured distance 36b falls within range 38b. If the measured distance 36 fell below a threshold value to move within range 38c, touch-sensor controller may configure clusters 30 as shown in FIG. 3C. If the measured distance 36 is increased above a threshold value to move within range 38a, touch-sensor controller may configure clusters 30 as shown in FIG. 3A. Any suitable cluster configuration and/or range may be used.

FIG. 3C illustrates an example cluster configuration that may be used in certain embodiments of a touch sensor. Touch sensor 10 includes clusters 30a-30e and panel 32. In the illustrated embodiment, touch sensor 10 may detect the presence and/or position of object 34, which is located a distance 36c from touch sensor 10.

Clusters 30a-30e include tracks 14a-14b, tracks 14c-14d, tracks 14e-14f, tracks 14g-14h, and tracks 14i-14j, respectively. In the illustrated embodiment, clusters 30a-30e each include two connected electrode tracks 14. Such tracks 14 may be galvanically connected by, for example, using various switches of touch-sensor controller 12. Galvanically connecting tracks 14 to form clusters 30 in this manner may increase the sensitivity of touch sensor 10, which may enable detection of the presence and/or position of object 34 at greater distances from touch sensor 10. Clusters of two tracks 14 may be more sensitive than clusters of a single track 14 (which may correspond to traditional sensing methods) but less sensitive than clusters using a greater number of tracks 14 (see, e.g., FIGS. 3A and 3B). Certain embodiments may reduce noise interference experienced during the sensing sequence since a stronger signal may be generated relative to the noise effects impacting the measured capacitance values. Connecting tracks 14 to form clusters 30 may result in improved noise protection compared to touch sensors that sum measurements of the individual tracks 14, because such touch sensors may also effectively sum the noise interference experienced by the tracks 14.

In the illustrated embodiment, object 34 is located distance 36c from touch sensor 10, which falls within range 38c. Touch-sensor controller 12 may configure clusters 30 as shown in FIG. 3C in response to determining that the measured distance 36c falls within range 38c. If the measured distance 36 is increased to move within range 38b, touch-sensor controller may configure clusters 30 as shown in FIG. 3B. If the measured distance 36 increased to move within range 38a, touch-sensor controller may configure clusters 30 as shown in FIG. 3A. Other embodiments may utilize any suitable ranges and any suitable configuration of clusters 30.

Figure 4A:
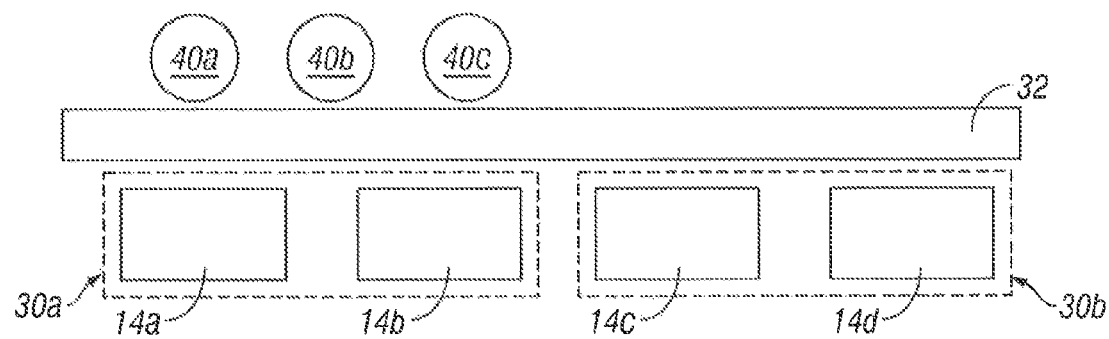
FIG. 4A illustrates example touch points on an example touch sensor.

FIG. 4A illustrates example touch points 40 on an example touch sensor 10. Touch sensor 10 includes panel 32 and clusters 30a and 30b. Clusters 30a and 30b include tracks 14a and 14b and tracks 14c and 14d, respectively. Panel 32, clusters 30, and tracks 14 may have any suitable structure, configuration, and/or function described above with respect to FIGS. 1, 2, and 3A-3C.

Touch points 40a-40c represent a position of object 34 (not shown) moving from left to right across touch sensor 10. Touch points 40 may be positions where a portion of object 34 physically touches touch sensor 10, or they may be orthogonal projections of a portion of object 34 onto touch sensor 10. In the illustrated embodiments, touch points 40a-40c each fall directly above a portion of cluster 30a. Because tracks 14a and 14b of cluster 30a may be galvanically connected and sensed together during the sensing sequence, the similar capacitance values measured at touch points 40a-40c (see FIG. 4B) may reduce the linearity of the measured position of object 34 as it moves across touch sensor 10. This issue is described further with respect to FIGS. 4B, 5A, and 5B. This potential for reduced precision may be mitigated by cluster configurations discussed below with respect to FIGS. 6A-6C.

Figure 4B:
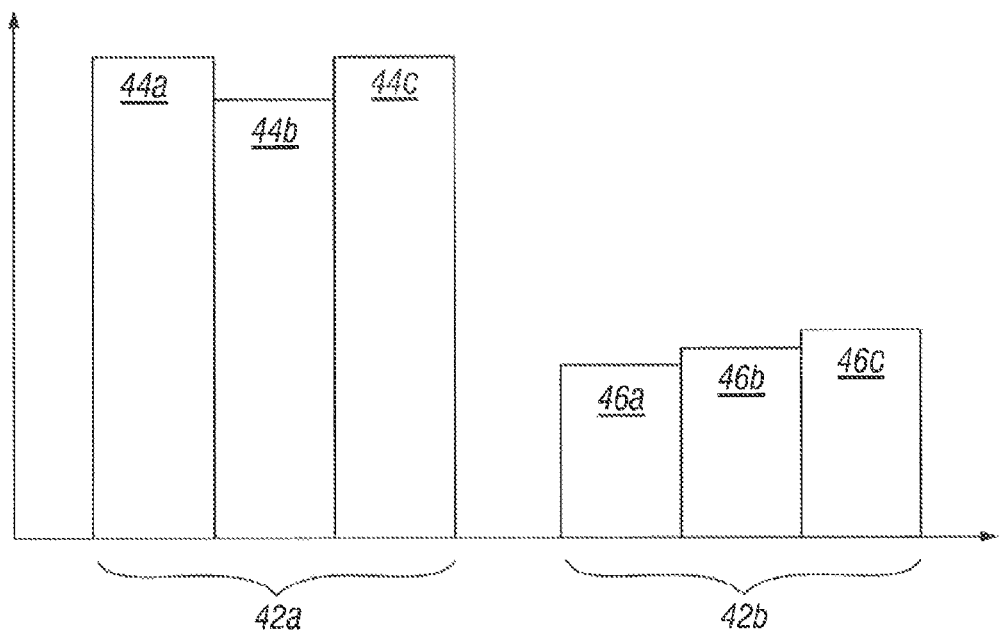
FIG. 4B illustrates a graph of example measurements that may be taken by certain embodiments of a touch sensor.

FIG. 4B illustrates a graph of example measurements 44 and 46 that may be taken by certain embodiments of touch sensor 10. Measurements 42a, which include measurements 44a-44c, correspond to measurements associated with cluster 30a of FIG. 4A. Measurements 42b, which include measurements 46a-46c, correspond to measurements associated with cluster 30b of FIG. 4A.

Measurements 42a represent values measured by cluster 30a of FIG. 4A, and measurements 42b represent values measured by cluster 30b of FIG. 4A. Measurements 44a-44c correspond to the values measured by cluster 30a at touch points 40a-40c, respectively, and measurements 46a-46c correspond to the values measured by cluster 30b at touch points 40a-40c, respectively. As discussed above, touch-sensor controller 12 may evaluate multiple measurements to determine the position of object 34. For example, the measured position of object 34 may be based on capacitive values measured by multiple clusters 30. Thus, as a particular example, the position of object 34 when object 34 is located at touch point 40a may be determined using measurements 44a and 46a (as well as values measured by other clusters 30). Furthermore, the position of object 34 may also be determined by taking into account previously measured values. Thus, as a particular example, the position of object 34 when object 34 is located at touch point 40c may be determined using measurements 44c and 46c as well as values measured during previous sensing sequences, such as 44b and 46b. Because tracks 14a and 14b of cluster 30a may be galvanically connected and sensed together during the sensing sequence, values measured when object 34 is located at touch points 40a-40c may not be sufficiently distinct to precisely distinguish between these touch points 40. Such measurement difficulties may be particular pronounced when clusters 30 include larger numbers of tracks 14.

Figure 5A:
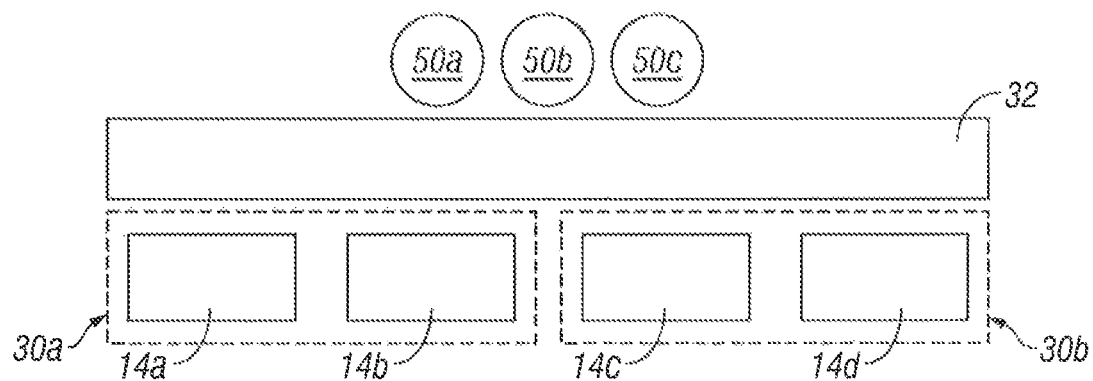
FIG. 5A illustrates example touch points on an example touch sensor.

FIG. 5A illustrates example touch points 50 on an example touch sensor 10. Touch sensor 10 includes panel 32 and clusters 30a and 30b. Clusters 30a and 30b include tracks 14a and 14b and tracks 14c and 14d, respectively. Panel 32, clusters 30, and tracks 14 may have any suitable structure, configuration, and/or function described above with respect to FIGS. 1, 2, and 3A-3C.

Touch points 50a-50c represent a position of object 34 (not shown) moving from left to right across touch sensor 10. Touch points 50 may be positions where a portion of object 34 physically touches touch sensor 10, or they may be orthogonal projections of a portion of object 34 onto touch sensor 10. In the illustrated embodiments, touch points 50a-50c move from left to right, moving from cluster 30a to cluster 30b. Because clusters 30a and 30b are not galvanically connected during their respective sensing sequences, capacitive values measured when object 34 is at touch points 50a-50c may provide improved touch resolution. For example, such embodiments may provide increased linearity when determining the position of object 34 as it moves across touch sensor 10 in a straight line. Certain embodiments may take advantage of improved touch-sensing precision at the borders of clusters 30 by utilizing cluster configurations discussed below with respect to FIGS. 6A-6C.

Figure 5B:
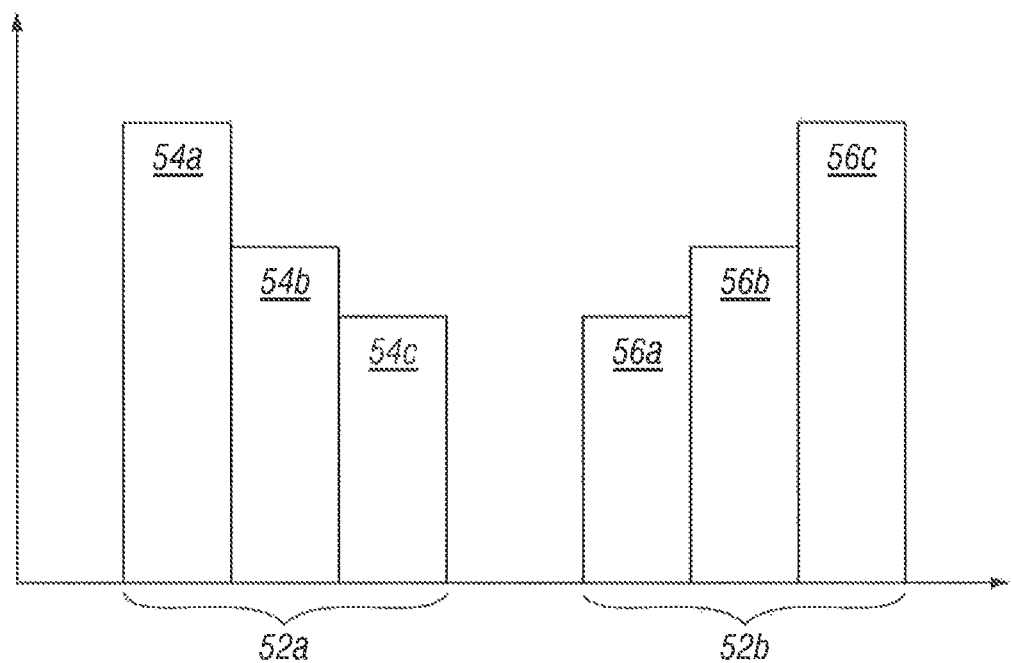
FIG. 5B illustrates a graph of example measurements that may be taken by certain embodiments of a touch sensor.

FIG. 5B illustrates a graph of example measurements 44 that may be taken by certain embodiments of touch sensor 10. Measurements 52a, which include measurements 54a-54c, correspond to measurements associated with cluster 30a of FIG. 5A. Measurements 52b, which include measurements 56a-56c, correspond to measurements associated with cluster 30b of FIG. 5A.

Measurements 52a represent values measured by cluster 30a of FIG. 5A, and measurements 52b represent values measured by cluster 30b of FIG. 5A. Measurements 54a-54c correspond to the values measured by cluster 30a at touch points 50a-50c, respectively, and measurements 56a-56c correspond to the values measured by cluster 30b at touch points 50a-50c, respectively. As discussed above, touch-sensor controller 12 may evaluate multiple measurements to determine the position of object 34. For example, the measured position of object 34 may be based on capacitive values measured by multiple clusters 30. Thus, as a particular example, the position of object 34 when object 34 is located at touch point 50*a* may be determined using measurements 54*a* and 56*a* (as well as values measured by other clusters 30). Furthermore, the position of object 34 may also be determined by taking into account previously measured values. Thus, as a particular example, the position of object 34 when object 34 is located at touch point 50*c* may be determined using measurements 54*c* and 56*c* as well as values measured during previous sensing sequences, such as 54*b* and 56*b*. Because clusters 30*a* and 30*b* may be sensed separately, values measured when object 34 is located at touch points 50*a*-50*c* may be sufficiently distinct to precisely distinguish between these touch points 50. Certain embodiments may take advantage of this improved touch-sensing precision at the borders of clusters 30 by utilizing cluster configurations discussed below with respect to FIGS. 6A-6C.

Figure 6A:
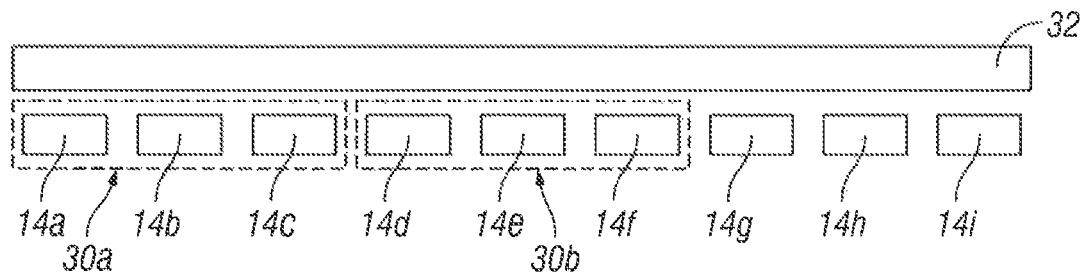
FIG. 6A illustrates an example cluster configuration that may be used in certain embodiments of a touch sensor.
Figure 6B:
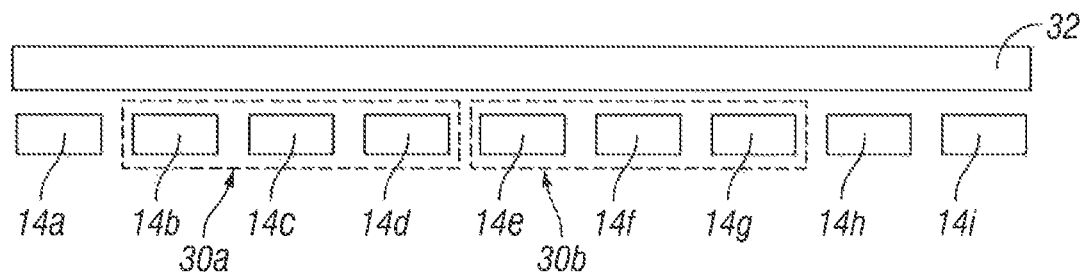
FIG. 6B illustrates an example cluster configuration that may be used in certain embodiments of a touch sensor.
Figure 6C:
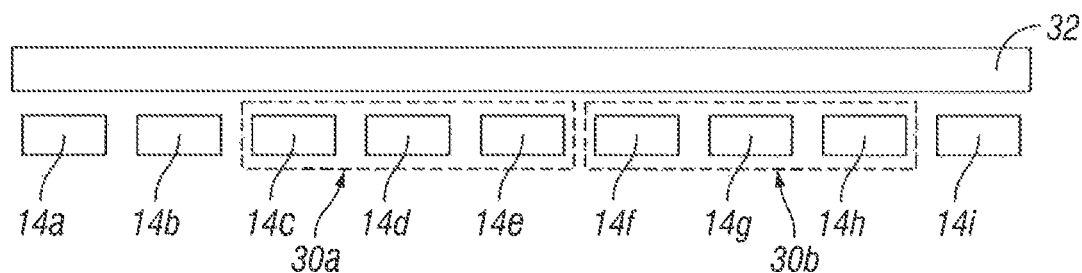
FIG. 6C illustrates an example cluster configuration that may be used in certain embodiments of a touch sensor.

FIGS. 6A-6C illustrate example cluster configurations that may be used in certain embodiments of touch sensor 10. Touch sensor 10 includes panel 32 and clusters 30*a* and 30*b*. In FIG. 6A, clusters 30*a* and 30*b* include tracks 14*a*-14*c* and tracks 14*d*-14*f*, respectively. In FIG. 6B, clusters 30*a* and 30*b* include tracks 14*b*-14*d* and tracks 14*e*-14*g*, respectively. In FIG. 6C, clusters 30*a* and 30*b* include tracks 14*c*-14*e* and tracks 14*f*-14*h*, respectively. For purposes of simplified illustration, FIGS. 6A-6C depict only clusters 30*a* and 30*b*. However, touch sensor 10 may include additional clusters 30 using tracks 14 that are not used in particular configurations of clusters 30*a* and 30*b*. Panel 32, clusters 30, and tracks 14 may have any suitable structure, configuration, and/or function described above with respect to FIGS. 1, 2, and 3A-3C.

FIGS. 6A-6C illustrate three cluster configurations that may be used in succession during a "rolling cluster" sequence. As used herein, a rolling cluster sequence refers to a sequential shifting of the configuration of clusters 30. As explained above with respect to FIGS. 4A-4B and 5A-5B, the position of object 34 may be more precisely determined when located at or near the intersection of clusters 30. Utilizing rolling clusters may increase the likelihood that object 34 is positioned at or near the intersection of two or more clusters 30, which may improve the precision, resolution, and/or linearity of touch-sensor 10. Such improvements may be particular useful when utilizing cluster configurations with larger numbers of tracks 14 per cluster 30.

In certain embodiments, touch-sensor controller 12 may sequentially alter the configuration of clusters 30. For example, tracks 14*a*-14*c* may be galvanically connected and sensed as cluster 30*a*, and tracks 14*d*-14*f* may be galvanically connected and sensed as cluster 30*b*, as shown in FIG. 6A. After measuring capacitance values associated with this configuration, tracks 14*b*-14*d* may be galvanically connected and sensed, and tracks 14*e*-14*g* may be galvanically connected and sensed, as shown in FIG. 6B. After measuring capacitance values associated with this configuration, tracks 14*c*-14*e* may be galvanically connected and sensed, and tracks 14*f*-14*h* may be galvanically connected and sensed, as shown in FIG. 6C. Touch-sensor controller 12 may determine the position of object 34 using the various capacitance values associated with these rolling clusters. For example, touch-sensor controller 12 may compare values measured by different clusters 30. As another example, touch-sensor controller 12 may average one or more capacitance values. As a particular example, touch-sensor controller 12 may average the three capacitance values associated with cluster 30*a* measured during the sensing sequences illustrated in FIGS. 6A-6C to determine an averaged value associated with track 14*c*, which was part of cluster 30*a* in each configuration. Analogous averaging may be performed for each track 14 using measurements from clusters 30 in which that track 14 was included. One or more additional calculations may also be used, such as, for example, weighted averages, linear approximation, and balanced position techniques. Rolling clusters may improve the precision, resolution, and/or linearity of touch sensors 10 utilizing clusters 30 that include multiple tracks 14. Such embodiments may enable touch sensor 10 to provide improved sensitivity resulting from clustering tracks 14, as described above, while also avoiding potential reductions in precision, resolution, and/or linearity (as described with respect to FIGS. 4A and 4B) that might otherwise be created by such clustering.

Figure 7:
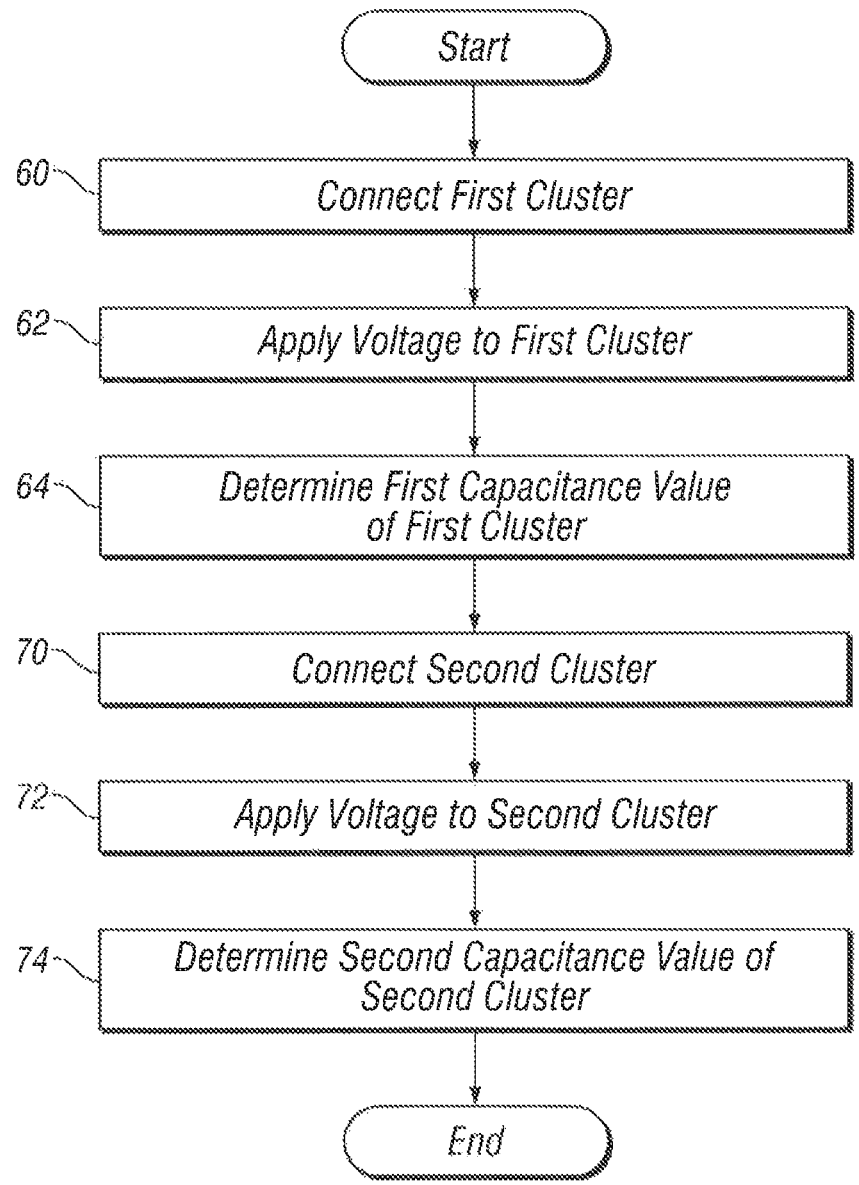
FIG. 7 illustrates an example method for use with certain embodiments of a touch sensor.

FIG. 7 illustrates an example method for use with certain embodiments of touch sensor 10. Various embodiments may perform some, all, or none of the steps described below. Furthermore, certain embodiments may perform these steps in different orders or in parallel, and certain embodiments may also perform additional steps. Moreover, any suitable component of system touch sensor 10 and/or touch-sensor controller 12 may perform one or more steps of the sensing sequence.

At step 60, tracks 14 are connected to form a first cluster 30. Tracks 14 may be connected galvanically, capacitively, or using any suitable method. As a particular example, first cluster 30 may be formed by configuring one or more switches. In certain embodiments, the connection of tracks 14 to form cluster 30 may be performed at least in part by touch-sensor controller 12. Additional first clusters 30 may also be configured during step 60. After connecting the tracks 14 of the first cluster 30, the sequence proceeds to step 62.

At step 62, voltage is applied to the first cluster 30. Voltage may be applied by connecting the cluster 30 to a voltage source (e.g. a voltage supply rail), a current source, or any other suitable component. Voltage may be applied for a fixed amount of time or a variable amount of time. In certain embodiments, the application of voltage to cluster 30 may be performed at least in part by touch-sensor controller 12. Voltage may also be applied to additional clusters 30, and multiple clusters 30 may be charged simultaneously. Thus, certain embodiments may apply voltage to a set of multiple first clusters 30. After applying the voltage to the first cluster 30, the sequence proceeds to step 64.

At step 64, a first capacitance value associated with the first cluster 30 is determined. Certain embodiments may also measure first capacitance values of additional clusters 30, and such measurements may be performed simultaneously or sequentially. Such values may be measured using any suitable method described above with respect to FIG. 1. The first capacitance value may be a capacitance or it may be a measurement that is proportional to, related to, or indicative of the capacitance (or change in capacitance) experienced by the first cluster 30. For example, the first value may be a voltage measurement, current measurement, timing measurement, any other suitable measurement, or any combination thereof. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of a position of object 34 relative to touch sensor 10. In certain embodiments, the determination of the first capacitance value may be performed at least in part by touch-sensor controller 12. The one or more first capacitance values may be used to determine the cluster configuration, trigger one or more functions, estimate a distance between object 34 and touch sensor 10, estimate a shape and/or size of object 34 (e.g., by analyzing the distribution of capacitance values measured by multiple first clusters 30), and/or perform any suitable function. After the determination of the first capacitance value, the sequence proceeds to step 70.

Some embodiments may also determine a distance between object 34 and touch sensor 10 based at least on the first capacitance value (or values). In some embodiments, this determination may factor in capacitance values associated with multiple clusters 30 (e.g., a "distribution" of multiple adjacent clusters 30). Distance may be estimated using various methods. For example, distance may be estimated as a function of the strength of one or more measured signals (e.g., the first capacitance value) and the signal distribution (e.g., the relative measurements of multiple clusters 30). Such functions may take into account various considerations. For example, for a particular object 34, the measured capacitance value may increase as object 34 approaches touch sensor 10. Furthermore, in some embodiments, the relationship between distance and signal strength may be non-linear, so linear approximations may be used. Furthermore, larger objects may create signals which spread more evenly over adjacent clusters 30, resulting in a "flatter" distribution of measured capacitance values. Conversely, smaller objects may create a "sharper" set of signals over adjacent clusters 30, resulting in a spiked distribution of measured capacitance values. Distance-estimating functions may be linear or non-linear. Furthermore, in some embodiments, such functions may utilize one or more lookup tables. Certain embodiments may take into account measurements taken by different cluster configurations (e.g., the cluster configurations of both FIG. 3A and FIG. 3B). Distance estimates may also be used to trigger one or more functions such as, for example, altering cluster configurations, entering or exiting a hibernation mode, turning a light on or off, or any suitable function.

At step 70, certain tracks 14 are connected to form a second cluster 30. Tracks 14 may be connected galvanically, capacitively, or using any suitable method. As a particular example, second cluster 30 may be formed by configuring one or more switches. The second cluster 30 may include more or fewer tracks 14 than the first cluster 30. The second cluster 30 may also include one or more tracks 14 that were included in the first cluster 30. For example, the first cluster 30 may correspond to cluster 30*a* of FIG. 3A, while the second cluster 30 may correspond to cluster 30*a* of FIG. 3B. Second cluster 30 may be formed by configuring one or more switches or by using any suitable method. In certain embodiments, the connection of tracks 14 to form second cluster 30 may be performed at least in part by touch-sensor controller 12. Additional second clusters 30 may also be formed during step 70.

Configuring one or more second clusters 30 as described in step 70 may be triggered at least by the one or more first capacitance values measured during step 64. For example, touch sensor 10 may be configured to perform one or more sensing sequences with first clusters 30 (e.g., clusters 30*a* and 30*b* of FIG. 3A) while the measured capacitance values meet certain conditions. Following step 64 above, touch-sensor controller 12 may determine, based at least on the first capacitance value, that the configuration of clusters 30 should be altered. For example, touch-sensor controller 12 may reduce the size of clusters 30, increase the size of clusters 30, or alter the configuration of clusters 30 in any suitable manner. This determination may also factor in capacitance values associated with additional clusters 30. Furthermore, one or more additional calculations may also be used, such as, for example, weighted averages, linear approximation, or any suitable calculation. After connecting the tracks 14 of the second cluster 30, the sequence proceeds to step 72.

At step 72, voltage is applied to the second cluster 30. Voltage may be applied by connecting the cluster 30 to a voltage source (e.g. a voltage supply rail), a current source, or any other suitable component. Voltage may be applied for a fixed amount of time or a variable amount of time. In certain embodiments, the application of voltage to cluster 30 may be performed at least in part by touch-sensor controller 12. Voltage may also be applied to additional clusters 30, and multiple clusters 30 may be charged simultaneously. Thus, certain embodiments may apply voltage to a set of multiple second clusters 30. After applying the voltage to the second cluster 30, the sequence proceeds to step 74.

At step 74, a second capacitance value associated with the second cluster 30 is determined. This value may be measured using any suitable method described above with respect to FIG. 1. The second capacitance value may be a capacitance (or change in capacitance) or it may be a measurement that is proportional to, related to, or indicative of the capacitance (or change in capacitance) experienced by the second cluster 30. For example, the second value may be a voltage measurement, current measurement, timing measurement, any other suitable measurement, or any combination thereof. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of a position of object 34 relative to touch sensor 10. In certain embodiments, the determination of the second capacitance value may be performed at least in part by touch-sensor controller 12. Additional adjustments of cluster sizes may be performed following the measurement of the second capacitance value. For example, the cluster size may be increased, decreased, or adjusted in any suitable manner.

By adjusting the sizes of clusters 30 in this manner, certain embodiments may adjust the strength and/or sensitivity of touch sensor 10 based on the distance between object 34 and touch sensor 10. Furthermore, certain embodiments may increase the resolution of touch sensor 10 and/or improve the linearity or "smoothness" of lines or curves drawn across touch sensor 10. Furthermore, certain embodiments may enable the triggering of one or more functions based on the presence of object 34, the position of object 34, and/or one or more measured capacitance values (or any value that is determined by the measured capacitance values). For example, certain embodiments may utilize maximum cluster sizes when the presence of object 34 is not detected, which may enable the detection of object 34 at greater distances. As another example, certain embodiments may adjust cluster configurations to use smaller cluster sizes as object 34 moves closer to touch screen, which may provide improved sensitivity at greater distances while providing optimal precision, resolution, and/or linearity at shorter distances. Such embodiments may optimize resolution while maintaining sufficient sensitivity by utilizing the smallest practicable cluster size given the current position of object 34, since (1) a certain minimum sensitivity is required to produce sufficient capacitance measurements and (2) smaller cluster sizes may yield increased touch resolution. Furthermore, one or more functions (e.g., awakening from a hibernation state, turning on one or more lights, altering cluster configurations, and/or any suitable function) may be triggered by one or more measured capacitance values or by the presence or position of object 34.

Figure 8:
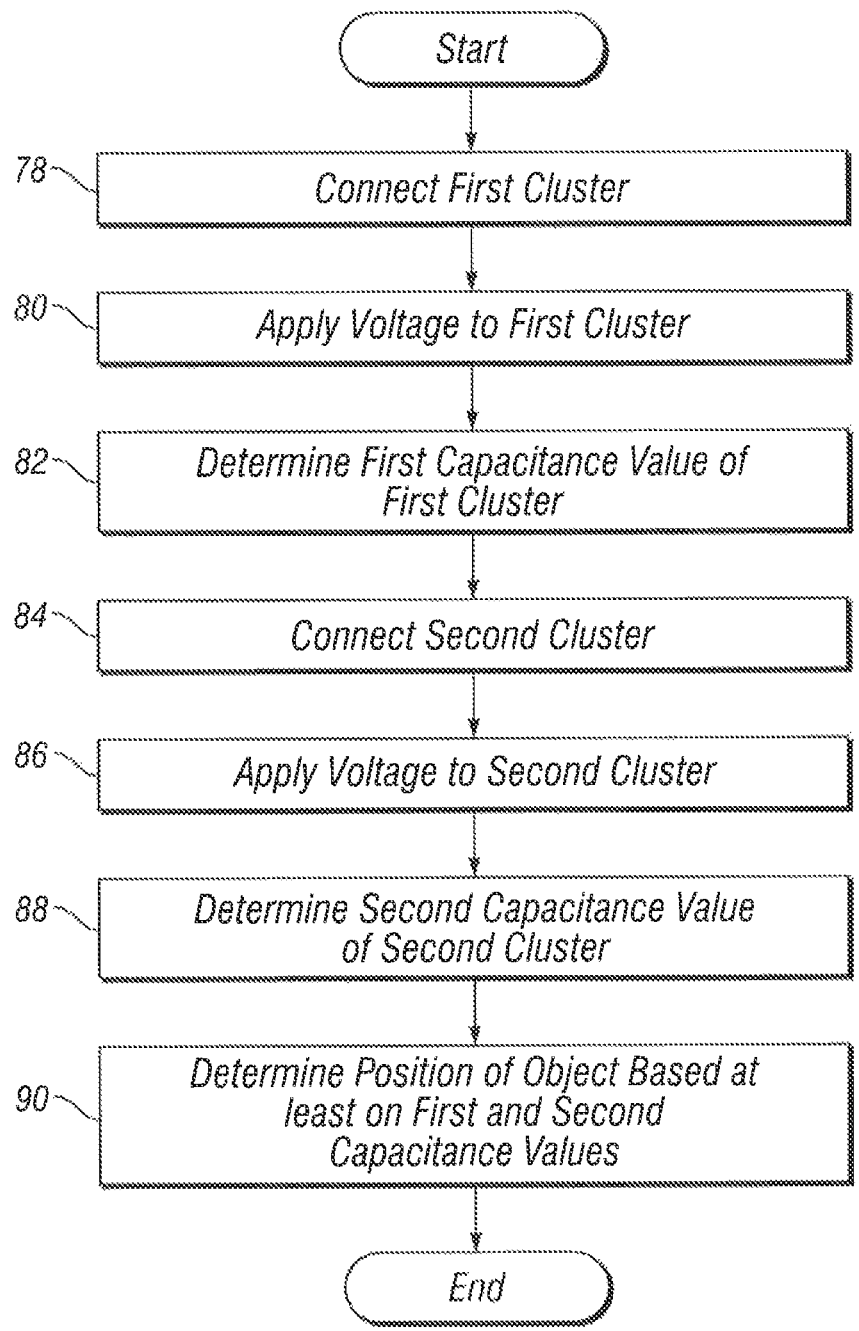
FIG. 8 illustrates an example method for use with certain embodiments of a touch sensor.

FIG. 8 illustrates an example method for use with certain embodiments of touch sensor 10. For example, the sequence of FIG. 8 may be used in embodiments utilizing a rolling cluster configuration, as described above with respect to FIGS. 6A-6C. Various embodiments may perform some, all, or none of the steps described below. Furthermore, certain embodiments may perform these steps in different orders or in parallel, and certain embodiments may also perform additional steps. Moreover, any suitable component of system touch sensor 10 and/or touch-sensor controller 12 may perform one or more steps of the sensing sequence.

At step 78, tracks 14 are connected to form a first cluster 30. Tracks 14 may be connected galvanically, capacitively, or using any suitable method. As a particular example, first cluster 30 may be formed by configuring one or more switches. In certain embodiments, the connection of tracks 14 to form cluster 30 may be performed at least in part by touch-sensor controller 12. Additional first clusters 30 may also be configured during step 78. After connecting the tracks 14 of the first cluster 30, the sequence proceeds to step 80.

At step 80, voltage is applied to the first cluster 30. Voltage may be applied by connecting the cluster 30 to a voltage source (e.g. a voltage supply rail), a current source, or any other suitable component. Voltage may be applied for a fixed amount of time or a variable amount of time. In certain embodiments, the application of voltage to cluster 30 may be performed at least in part by touch-sensor controller 12. Voltage may also be applied to additional clusters 30, and multiple clusters 30 may be charged simultaneously. Thus, certain embodiments may apply voltage to a set of multiple first clusters 30. After applying the voltage to the first cluster 30, the sequence proceeds to step 82.

At step 82, a first capacitance value associated with the first cluster 30 is determined. Certain embodiments may also measure first capacitance values of additional clusters 30, and such measurements may be performed simultaneously or sequentially. Such values may be measured using any suitable method described above with respect to FIG. 1. The first capacitance value may be a capacitance or it may be a measurement that is proportional to, related to, or indicative of the capacitance (or change in capacitance) experienced by the first cluster 30. For example, the first value may be a voltage measurement, current measurement, timing measurement, any other suitable measurement, or any combination thereof. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of a position of object 34 relative to touch sensor 10. In certain embodiments, the determination of the first capacitance value may be performed at least in part by touch-sensor controller 12. The one or more first capacitance values may be used to determine the cluster configuration, trigger one or more functions, estimate a distance between object 34 and touch sensor 10, estimate a shape and/or size of object 34 (e.g., by analyzing the distribution of capacitance values measured by multiple first clusters 30), and/or perform any suitable function. After the determination of the first capacitance value, the sequence proceeds to step 84.

At step 84, certain tracks 14 are connected to form a second cluster 30. Tracks 14 may be connected galvanically, capacitively, or using any suitable method. As a particular example, second cluster 30 may be formed by configuring one or more switches. The second cluster 30 may include the same number of tracks 14 as the first cluster 30, though this is not required. The second cluster 30 may also include one or more tracks 14 that were also included in the first cluster 30, and the second cluster 30 may also include one or more tracks 14 that were not included in first cluster 30. Furthermore, the second cluster 30 may also exclude one or more tracks 14 that were included in the first cluster 30. For example, the first cluster 30 may correspond to cluster 30a of FIG. 6A, while the second cluster 30 may correspond to cluster 30a of FIG. 6B. The second cluster 30 may be formed by configuring one or more switches or by using any suitable method. In certain embodiments, the connection of tracks 14 to form second cluster 30 may be performed at least in part by touch-sensor controller 12. Additional second clusters 30 may also be configured during step 84. After connecting the tracks 14 of the second cluster 30, the sequence proceeds to step 86.

At step 86, voltage is applied to the second cluster 30. Voltage may be applied by connecting the cluster 30 to a voltage source (e.g. a voltage supply rail), a current source, or any other suitable component. Voltage may be applied for a fixed amount of time or a variable amount of time. In certain embodiments, the application of voltage to cluster 30 may be performed at least in part by touch-sensor controller 12. Voltage may also be applied to additional clusters 30, and multiple clusters 30 may be charged simultaneously. Thus, certain embodiments may apply voltage to a set of multiple first clusters 30. After applying the voltage to the second cluster 30, the sequence proceeds to step 88.

At step 88, a second capacitance value associated with the second cluster 30 is determined. The second capacitance value may be a capacitance (or change in capacitance) or it may be a measurement that is proportional to, related to, or indicative of the capacitance (or change in capacitance) experienced by the second cluster 30. For example, the second value may be a voltage measurement, current measurement, timing measurement, any other suitable measurement, or any combination thereof. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of a position of object 34 relative to touch sensor 10. In certain embodiments, the determination of the second capacitance value may be performed at least in part by touch-sensor controller 12. The one or more first capacitance values may be used to determine the cluster configuration, trigger one or more functions, estimate a distance between object 34 and touch sensor 10, estimate a shape and/or size of object 34 (e.g., by analyzing the distribution of capacitance values measured by multiple first clusters 30), and/or perform any suitable function. After the determination of the second capacitance value, the sequence proceeds to step 90.

At step 90, a position of object 34 is determined based at least on the first and second capacitance values. In some embodiments, this determination may also factor in capacitance values associated with additional clusters 30. Furthermore, one or more additional calculations may also be used, such as, for example, weighted averages, linear approximation, or any suitable technique. The measured position may be an estimation of where a portion of object 34 physically touches touch sensor 10. The measured position may also be an estimation of an orthogonal projection of a portion of object 34 onto touch sensor 10. In certain embodiments, the determination of the distance between object 34 and touch sensor 10 may be performed at least in part by touch-sensor controller 12.

Because the determination of the position is based on multiple measurements from rolling clusters, as described above, this sensing sequence may improve the precision, resolution, and/or linearity of touch sensors 10 utilizing clusters 30 that include multiple tracks 14. Such embodiments may enable touch sensor 10 to provide improved sensitivity resulting from clustering tracks 14, as described above, while also avoiding potential reductions in precision, resolution, and/or linearity (as described with respect to FIGS. 4A and 4B) that might otherwise be created by utilizing larger cluster sizes. Such technical advantages may also improve the precision, resolution, and/or linearity of hover measurements. Furthermore, rolling clusters may be used in conjunction with one or more other sensing methods. For example, rolling cluster configurations may be used in addition to the dynamic cluster sizes described above with respect to FIGS. 3A-3C and 7.

Herein, "or" is inclusive and not exclusive, unless expressly indicated otherwise or indicated otherwise by context. Therefore, herein, "A or B" means "A, 13, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, while the embodiment of FIG. 2 illustrates a particular configuration of tracks 14, any suitable configuration may be used. As another example, while FIGS. 3A-3C, 4A, 5A, and 6A-6C illustrate particular configurations of clusters 30, any suitable number, type, and configuration may be used. As another example, while FIGS. 3A-3C, 4A, 5A, and 6A-6C depict a single layer of tracks 14, other embodiments may include multiple layers of tracks 14. As yet another example, while this disclosure describes certain touch-sensing operations that may be performed using the components of touch sensor 10 and touch-sensor controller 12, any suitable touch-sensing operations may be performed. Furthermore, certain embodiments may alternate between or combine one or more touch-sensing methods described herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
    a sensor comprising a plurality of electrodes;
    a controller comprising:
        a processor; and
        a memory comprising logic operable, when executed by the processor, to:
            connect each electrode of a first subset of the plurality of electrodes;
            apply voltage to the first subset after connecting each electrode of the first subset;
            determine a first value associated with a capacitance of the first subset after applying voltage to the first subset;
            determine, based at least on the first value, whether to alter the first subset of the plurality of electrodes to a second subset of the plurality of electrodes;
            connect, in response to determining to alter the first subset of the plurality of electrodes to the second subset of the plurality of electrodes, each electrode of the second subset of the plurality of electrodes, the second subset having fewer electrodes than the first subset;
            apply voltage to the second subset after connecting each electrode of the second subset; and
            determine a second value associated with a capacitance of the second subset after applying voltage to the second subset.

2. The apparatus of claim 1, wherein the logic is further operable, when executed by the processor, to:
    based at least on the second value, connect a third subset of the plurality of electrodes, the third subset having fewer electrodes than the second subset;
    apply voltage to the third subset after connecting each electrode of the third subset; and
    determine a third value associated with a capacitance of the third subset after applying voltage to the third subset.

3. The apparatus of claim 1, wherein:
    determining the first value comprises measuring a first voltage associated with the first subset after the application of voltage to the first subset; and
    determining the second value comprises measuring a second voltage associated with the second subset after the application of voltage to the second subset.

4. The apparatus of claim 1, wherein the determination of the first and second values utilizes self-capacitance measurements.

5. The apparatus of claim 1, wherein the first subset comprises a first electrode and a second electrode adjacent and substantially parallel to the first electrode.

6. The apparatus of claim 1, wherein:
    the logic is further operable, when executed by the processor, to:
        connect each electrode of a third subset of the plurality of electrodes, the third subset having the same number of electrodes as the first subset;

apply voltage to the third subset after connecting each electrode of the third subset; and determine a third value associated with a capacitance of the third subset after applying voltage to the third subset; and the connection of each electrode of a second subset is based at least on the first and third values.

7. The apparatus of claim 1, wherein the first subset includes one or more electrodes that are not included in the second subset and includes one or more electrodes that are included in the second subset.

8. A method comprising:

connecting each electrode of a first subset of a plurality of electrodes of a sensor;

applying voltage to the first subset after connecting each electrode of the first subset;

determining a first value associated with a capacitance of the first subset after applying voltage to the first subset;

determining, based at least on the first value, to alter the first subset of the plurality of electrodes to a second subset of the plurality of electrodes;

connecting, in response to determining to alter the first subset of the plurality of electrodes to the second subset of the plurality of electrodes, each electrode of the second subset of the plurality of electrodes, the second subset having fewer electrodes than the first subset;

applying voltage to the second subset after connecting each electrode of the second subset; and determining a second value associated with a capacitance of the second subset after applying voltage to the second subset.

9. The method of claim 8, further comprising:

based at least on the second value, connecting each electrode of a third subset of the plurality of electrodes, the third subset having fewer electrodes than the second subset;

applying voltage to the third subset after connecting each electrode of the third subset; and determining a third value associated with a capacitance of the third subset after applying voltage to the third subset.

10. The method of claim 8, wherein:

determining the first value comprises measuring a first voltage associated with the first subset after the application of voltage to the first subset; and determining the second value comprises measuring a second voltage associated with the second subset after the application of voltage to the second subset.

11. The method of claim 8, wherein the determination of the first and second values utilizes self-capacitance measurements.

12. The method of claim 8, further comprising:

connecting each electrode of a third subset of the plurality of electrodes, the third subset having the same number of electrodes as the first subset;

applying voltage to the third subset after connecting each electrode of the third subset; and determining a third value associated with a capacitance of the third subset after applying voltage to the third subset;

wherein the connection of each electrode of a second subset is based at least on the first and third values.

13. The method of claim 8, wherein the application of voltage to the first and third subsets is substantially simultaneous.

14. An apparatus comprising:

one or more processors; and a non-transitory computer-readable storage medium comprising logic, the logic configured to, when executed by the one or more processors, cause the one or more processors to perform operations comprising:

connecting each electrode of a first subset of a plurality of electrodes;

applying voltage to the first subset after connecting each electrode of the first subset;

determining a first value associated with a capacitance of the first subset after applying voltage to the first subset;

determining, based at least on the first value, whether to alter the first subset of the plurality of electrodes to a second subset of the plurality of electrodes;

connecting, in response to determining to alter the first subset of the plurality of electrodes to the second subset of the plurality of electrodes, each electrode of the second subset of the plurality of electrodes, wherein the second subset includes one or more electrodes included in the first subset, includes one or more electrodes not included in the first subset, and does not include one or more electrodes included in the first subset;

applying voltage to the second subset after connecting each electrode of the second subset;

determining a second value associated with a capacitance of the second subset after applying voltage to the second subset; and determining a position of an object based at least on the first and second values, the position indicating a projection of a portion of the object over a surface of the sensor.

15. The apparatus of claim 14, wherein the operations further comprise:

connecting each electrode of a third subset of the plurality of electrodes, wherein the third subset includes one or more electrodes included in the first and second subsets, includes one or more electrodes not included in the first and second subsets, and does not include one or more electrodes included in the first and second subsets;

applying voltage to the third subset after connecting each electrode of the third subset; and determining a third value associated with a capacitance of the third subset after applying voltage to the third subset;

wherein the determination of the position of the object is based further on the third value.

16. The apparatus of claim 15, wherein:

the plurality of electrodes comprises first, second, third, fourth, and fifth electrodes;

the first subset comprises the first, second, and third electrodes;

the second subset comprises the second, third, and fourth electrodes; and the third subset comprises the third, fourth, and fifth electrodes.

17. The apparatus of claim 14, wherein:

determining the first value comprises measuring a first voltage associated with the first subset after the application of voltage to the first subset; and determining the second value comprises measuring a second voltage associated with the second subset after the application of voltage to the second subset.

18. The apparatus of claim 14, wherein the determination of the first and second values utilizes self-capacitance measurements.

19. A method comprising:
connecting each electrode of a first subset of a plurality of electrodes of a sensor;
applying voltage to the first subset after connecting each electrode of the first subset;
determining a first value associated with a capacitance of the first subset after applying voltage to the first subset;
determining, based at least on the first value, to alter the first subset of the plurality of electrodes to a second subset of the plurality of electrodes;
connecting, in response to determining to alter the first subset of the plurality of electrodes to the second subset of the plurality of electrodes, each electrode of the second subset of the plurality of electrodes, wherein the second subset includes one or more electrodes included in the first subset, includes one or more electrodes not included in the first subset, and does not include one or more electrodes included in the first subset;
applying voltage to the second subset after connecting each electrode of the second subset;
determining a second value associated with a capacitance of the second subset after applying voltage to the second subset; and
determining a position of an object based at least on the first and second values, the position indicating a projection of a portion of the object over a surface of the sensor.

20. The method of claim 19, wherein:
the plurality of electrodes comprises first, second, third, fourth, and fifth electrodes;
the first subset comprises the first, second, and third electrodes;
the second subset comprises the second, third, and fourth electrodes; and
the third subset comprises the third, fourth, and fifth electrodes.

21. The method of claim 19, further comprising:
connecting each electrode of a third subset of the plurality of electrodes, wherein the third subset includes one or more electrodes included in the first and second subsets, includes one or more electrodes not included in the first and second subsets, and does not include one or more electrodes included in the first and second subsets;
applying voltage to the third subset after connecting each electrode of the third subset; and
determining a third value associated with a capacitance of the third subset after applying voltage to the third subset;
wherein the determination of the position of the object is based further on the third value.

22. The method of claim 19, wherein:
determining the first value comprises measuring a first voltage associated with the first subset after the application of voltage to the first subset; and
determining the second value comprises measuring a second voltage associated with the second subset after the application of voltage to the second subset.

23. The method of claim 19, wherein the determination of the first and second values utilizes self-capacitance measurements.

* * * * *